United States Patent [19]
Ota et al.

[11] Patent Number: 5,482,585
[45] Date of Patent: Jan. 9, 1996

[54] PROCESS FOR OPTICALLY JOINING AN OPTICAL FIBER ARRAY TO AN OPPONENT MEMBER

[75] Inventors: Takashi Ota, Kasugai; Masashi Fukuyama, Nagoya, both of Japan

[73] Assignee: NGK Insulators, Ltd., Japan

[21] Appl. No.: 191,536

[22] Filed: Feb. 4, 1994

[30] Foreign Application Priority Data

Feb. 12, 1993 [JP] Japan .................................. 5-024159

[51] Int. Cl.⁶ .............................. G02B 6/30; G02B 6/40
[52] U.S. Cl. ........................... 156/158; 156/296; 385/14; 385/49
[58] Field of Search ................................. 156/296, 158; 385/97, 98, 14, 49, 83

[56] References Cited

U.S. PATENT DOCUMENTS

| | | | |
|---|---|---|---|
| 3,798,099 | 3/1974 | Marcatili | 385/98 |
| 4,639,074 | 1/1987 | Murphy | 385/49 |
| 5,155,787 | 10/1992 | Carpenter et al. | 385/96 |
| 5,379,360 | 1/1995 | Ota et al. | 385/59 |

FOREIGN PATENT DOCUMENTS

| | | |
|---|---|---|
| 0331334 | 9/1989 | European Pat. Off. . |
| 0388642 | 9/1990 | European Pat. Off. . |
| 0573288 | 6/1993 | European Pat. Off. . |
| 2-125209 | 5/1990 | Japan . |
| 2-285306 | 11/1990 | Japan . |
| 2191601 | 12/1987 | United Kingdom . |

OTHER PUBLICATIONS

Patent Abstracts of Japan, vol. 14, No. 349 (P-1084) (4292) May 14, 1990 & JP-A-02 125 209 (Sumitomo Electric).

*Primary Examiner*—Jeff H. Aftergut
*Assistant Examiner*—Richard Crispino
*Attorney, Agent, or Firm*—Parkhurst, Wendel & Rossi

[57] ABSTRACT

A process for optically joining a plurality of optical fibers to an opponent member, comprising the steps of forming an optical fiber array by fixing the optical fibers between a V-grooved base plate and a fixing base plate in the state that the optical fibers are fitted to respective V-grooves formed on a surface of the V-grooved base plate, and optically joining the optical fibers of the optical fiber array to the opponent member by using, as a joining reference surface, either one of a first surface of the fixing base plate at which the optical fibers are fixed and a second surface of the fixing base plate opposite to said surface.

10 Claims, 5 Drawing Sheets

FIG_1
PRIOR ART
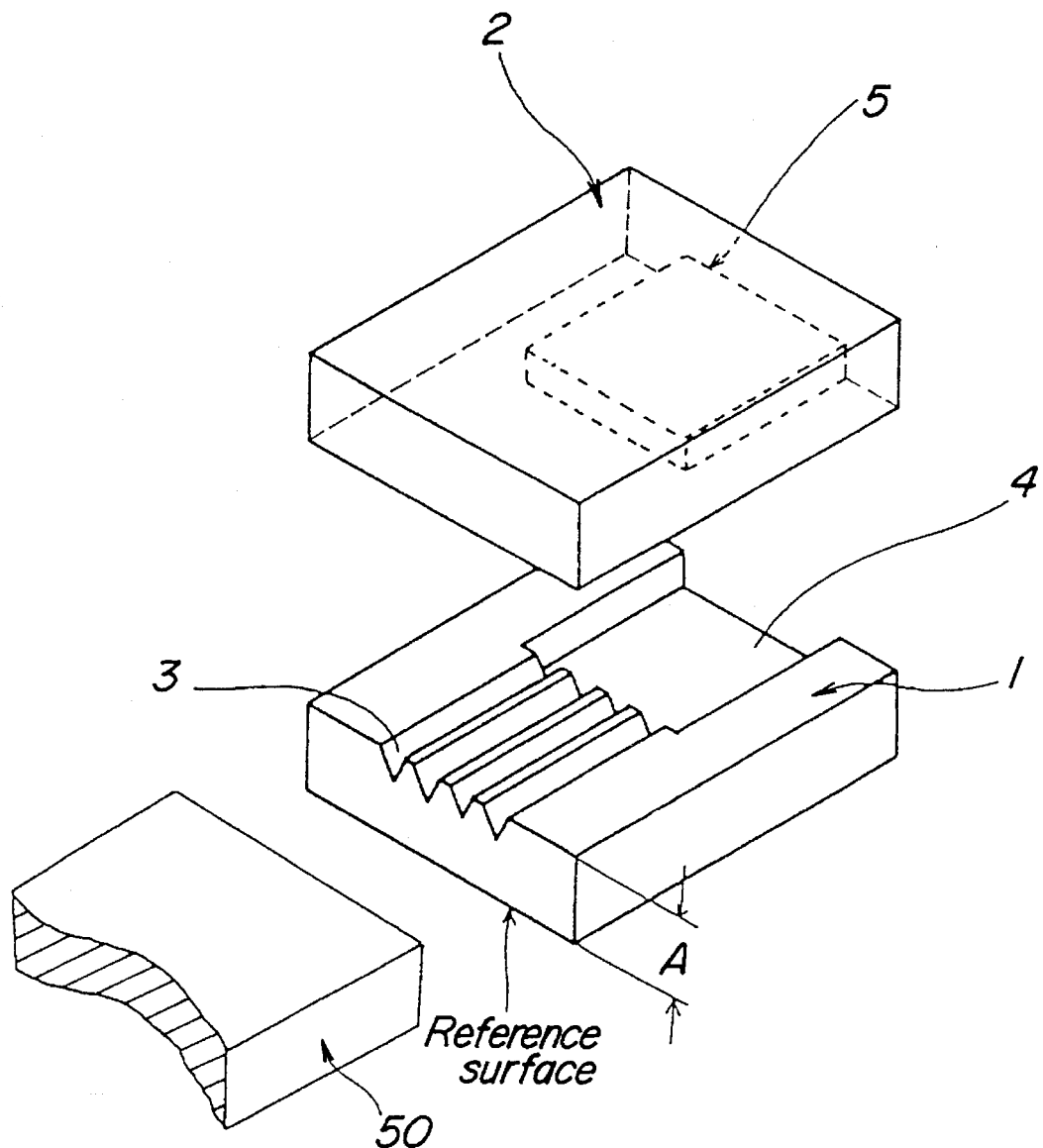

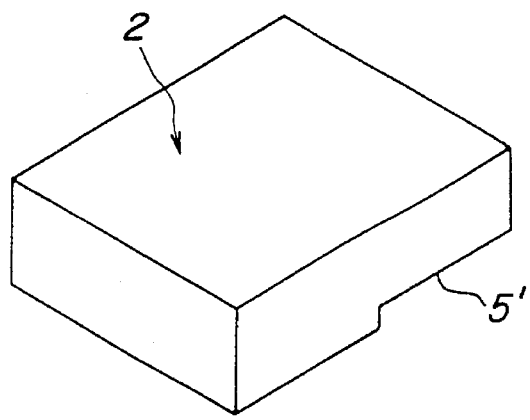
FIG.5
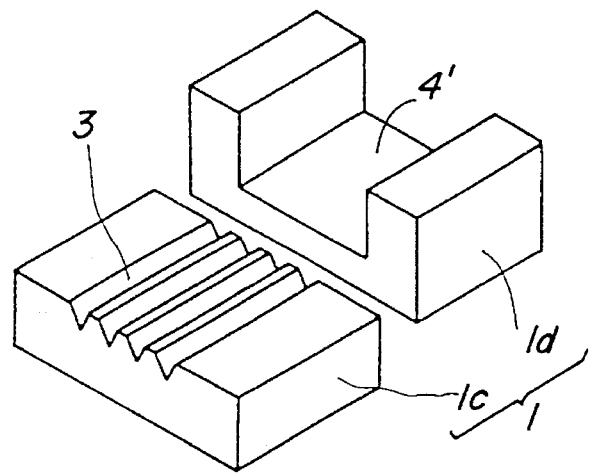
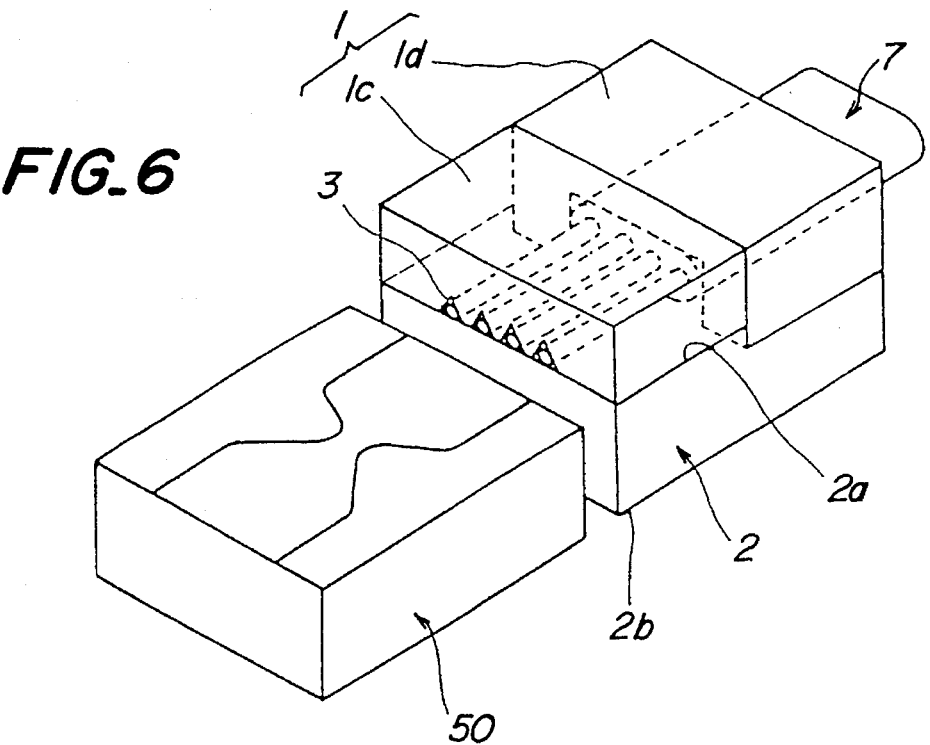
FIG.6

PROCESS FOR OPTICALLY JOINING AN OPTICAL FIBER ARRAY TO AN OPPONENT MEMBER

BACKGROUND OF THE INVENTION (1) Field of the Invention

The present invention relates to a process for optically joining an optical fiber array to an opponent member.

(2) Related Art Statement

In order to optically join an optical fiber to an opponent member such as an optical waveguide, it is necessary to coincide a center of a core of the optical fiber with an optical center of the opponent member. For this purpose, an optical fiber array is first prepared by fixing the optical fiber between a V-grooved base plate and a fixing base plate, and this optical fiber array is aligned with the opponent member. In order to accurately effect this alignment, the following processes have been heretofore developed and investigated.

According to a first process, an optical fiber array and an opponent member are placed on respectively separate stages, a light beam is projected into the optical fiber array as an input terminal, and the optical fiber array is joined to the opponent member after alignment through which one or two stages are finely moved to maximize a power of the light beam emitted from the opponent member maximum. This process is the most general and practical process currently performed. However, the process requires a complicated system, and complexity and cost required for the completion of the joining pose great problems.

According to a second process, a guide groove is formed in an optical fiber array and a corresponding guide groove is formed in an opponent member. Then, alignment is effected between them by inserting a guide pin into both the guide grooves. However, this process has the problem in that it takes time to form the guide grooves. In particular, since the guide groove must be formed on the opponent member without grinding the upper surface thereof when the opponent member is an optical waveguide substrate, it is very difficult to attain given accuracy.

According to a third process, an optical fiber array is aligned with an opponent member by using given outer surfaces of the optical fiber array and the opponent member as reference surfaces. This process is very attractive in that the alignment is automatically effected only by inserting both the array and the opponent member into a given package. However, there has been no manufacturer who has succeeded in the actual industrial development of this third process, which is now under development.

When the optical fiber is to be optically connected to the opponent member according to the third process, it is considered to be a common practice that an optical fiber array is formed by accurately locating optical fibers by using a V-grooved base plate 1 and a fixing base plate 2 as shown in FIG. 1, and the optical fiber array is joined to the opponent member by using a bottom surface of the V-grooved base plate as a reference surface, while an optical center of the opponent member 50 is coincided with centers of cores of the optical fibers. A plurality of V-grooves 3 for fixing bared optical fibers and a recess 4 for receiving a tape-shaped covering of the optical fibers are formed in the V-grooved base plate 1. In the fixing base plate 2 are formed a flat surface portion for fixing the bared portions of the optical fibers in the respective V-grooves 3 and a recess 5 for receiving the covering. The V-grooves are formed in such a dimension that when the optical fibers are fitted to the respective V-grooves and the fixing base plate is placed on the optical fibers, each of the optical fibers is brought into close contact with opposite inclined surfaces of the V-groove and the flat surface of the fixing base plate, so that the optical fibers are accurately located and the fixing base plate is accordingly accurately held on the optical fibers.

However, since the V-grooved base plate 1 needs to be bonded to a surface of a glass plate or the like with an adhesive in order to work the V-grooves 3 for fixing the optical fibers in the base plate 1, occurrence of a dimensional error of around ±30 μm resulting from the adhesive layer cannot be avoided. Therefore, the distance A from a reference bottom face of the glass plate bonded to the base plate 1 to the opposite surface thereof, that is, to the vertical position of the V-groove, has a variation in a range of about ±30 μm. As a result, it is necessary to effect fine adjustment in alignment between the optical fiber array and the opponent member 50 not only in a horizontal direction but also in a vertical direction, so that much time is required to effect the aligning and joining works.

SUMMARY OF THE INVENTION

It is therefore an object of the present invention to solve the above mentioned problems, and the invention has been accomplished to provide a process for optically joining an optical fiber array to an opponent member at high efficiency through the removal of a dimensional error in a distance from a reference surface to an upper surface of a V-grooved base plate (distance "A" in FIG. 1).

The present invention, which has been accomplished to solve the above problems, is characterized in that optical fibers are fixed between a V-grooved base plate and an optical fiber-fixing base plate in such a state that the optical fibers are fitted to respective optical fiber-fixing V-grooves formed on the V-grooved base plate, and then the optical fibers are optically joined to an opponent member by using, as a joining reference surface, a surface of the fixing base plate by which the optical fibers are fixed or another surface of the fixing base plate opposite to said surface.

According to the present invention, a bottom surface of the V-grooved base plate is not used as the reference surface, different from the prior art, and instead the optical fiber-fixing surface or its opposite surface of the fixing base plate for fixing the optical fibers in the respective V-grooves of the V-grooved base plate is used as the reference surface. Since no V-grooves need be formed on the fixing base plate, the distance between the optical fiber-fixing surface or its opposite surface of the fixing base plate and the center of the core of each of the optical fibers is accurately set. Consequently, it is unnecessary to make fine adjustment in a vertical direction when the optical fibers are optically joined to the opposed member. Therefore, according to the joining process of the present invention, the alignment has only to be made in the horizontal direction, so that the joining work can be effectively done.

Further, since this process belongs to the third process mentioned before, in which the alignment is effected by using the surface of the optical fiber-fixing base plate, as a reference surface, the joining process of the second aspect of the present invention has the advantage in that a complicated system as required in the first process or a provision of a guide groove as required in the second process can be omitted.

These and other objects, features and advantages of the invention will be appreciated upon reading the following description of the invention when taken in conjunction with the attached drawings.

BRIEF DESCRIPTION OF THE ATTACHED DRAWINGS

For a better understanding of the invention, reference is made to the attached drawings, wherein:

FIG. 1 is a perspective view for illustrating the conventional joining process;

FIG. 5 is a perspective view of a V-grooved base plate and a fixing plate to be used in a third embodiment of the joining process according to the present invention in a disassembled state;

FIG. 6 is a perspective view illustrating the third embodiment of the joining process of the present invention;

DETAILED DESCRIPTION OF THE INVENTION

Figure 2A:
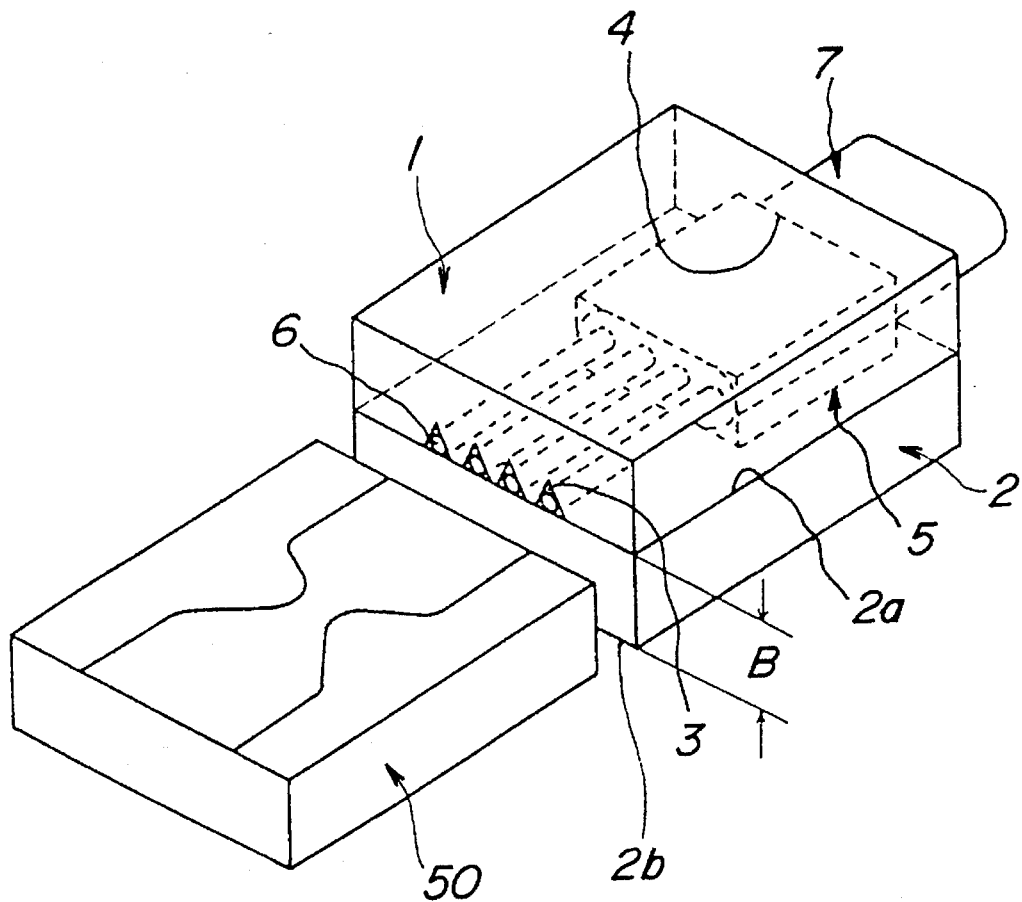
FIG. 2(A) is a perspective view illustrating a first embodiment of the joining process according to the present invention.

The present invention will be explained in more detail with reference to embodiments illustrated in the attached drawings. Throughout the specification and the drawings, the same or similar reference numerals are given to the same or similar constituent parts.

Figure 2B:
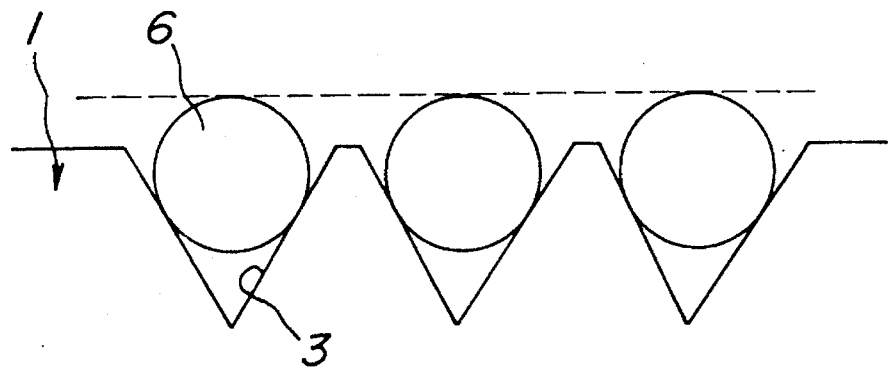
FIG. 2(B) is a front view illustrating the state in which bared portions of optical fibers are fitted to V-grooves of a V-grooved base plate in the first embodiment.

A first embodiment of the joining process of the present invention is shown in FIG. 2(A), in which reference numerals 1 and 2 denote a V-grooved base plate and a fixing base plate as illustrated in FIG. 1, respectively. As mentioned before, bared optical fibers 6 are accurately located between V-grooves 3 formed on the V-grooved base plate 1 and the fixing base plate 2, and a band-shaped covering 7 for the optical fibers is placed in covering-receiving recesses 4 and 5 formed in the V-grooved base plate 1 and the fixing base plate 2, respectively. The V-grooves can be accurately formed in the V-grooved base plate 1, and the bared optical fiber can be also formed at substantially the same diameter over an entire length thereof. Therefore, as shown in FIG. 2(B), when the bared optical fibers 6 are fitted to the respective V-grooves of the V-grooved base plate while upper portions of the bared optical fibers 6 are exposed outside from the V-grooves, a substantially straight line (substantially flat plane) is formed by connecting uppermost points (lines) of outer peripheral surfaces of the bared optical fibers. Thus, when the fixing base plate 2 is placed on the bared optical fibers, each of the bared optical fiber is closely supported and fixed by the fixing base plate 2 and opposite inclined surfaces of the V-groove substantially at three points (three lines).

In FIG. 2(A), optical means such as optical waveguides (not clearly shown) are provided on or in the opponent member at locations corresponding to cores of bared optical fibers 6 fitted to the V-grooves, respectively.

As shown in FIG. 2(A), an optical fiber array, which is formed by fitting the bared optical fibers to the V-grooves and fixing the optical fibers between the V-grooved base plate and the fixing base plate, is vertically reversed from the posture shown in FIG. 1, and a surface $2b$ of the fixing base plate 2 opposite to an optical fiber-fixing surface $2a$ thereof as a reference surface. Since this fixing base plate 2 requires no complicating working, different from the V-grooved base plate 1, the thickness B of the fixing base plate 2 can be made constant. For example, a flatness degree in a range of $\pm 1$ μm may be attained by polishing the opposite surfaces of the fixing base plate. Therefore, when the core centers of the bared optical fibers fitted to the V-grooves are made in coincide with the height of the optical center of the opponent member 50, the optical fibers can be optically joined to the opponent member, while almost no fine adjustment is made in the vertical direction. Thereby, workability in the joining operation can be largely enhanced. According to the present invention (the embodiments in FIGS. 2A through FIG. 8) the V-grooved base plate and the fixing base plate are ordinarily made of a hard but brittle material such as a glass ceramic or silicon. Since communication optical fibers are ordinarily made of quartz and these base plates are to fix optical fibers, a glass and a $Li_2O.Al_2O_3.SiO_2$ based glass ceramic are preferred, which have coefficients of thermal expansion near that of quartz.

The optical fiber array is finally fixed to the opponent member, for example, by using an adhesive. That is, the joining "joining" between the optical fibers and the opponent member is finally completed by bonding an end face of the optical fiber array to an opposed end face of the opponent member with an adhesive. Since this bonding method belongs to the state of the art, detailed explanation is omitted. In the above case, since a UV-curable adhesive may be used, a glass or a glass ceramic having a high UV-permeability is preferably used from this standpoint.

As the opponent member to be joined to the optical fiber array, a variety of elements such as an optical waveguide, a semiconductor light-emission element, a light-receiving element, a polarizer, a lens, etc. may be employed. Considering this, working precisions of the base plates are as follows:

| | |
|---|---|
| i) Precision of thickness of the given thickness optical fiber-fixing base plate: | given thickness $\pm 0.01$ mm |
| ii) Parallel degree of opposite surface: | $\leq 5$ μm |
| iii) Flatness degree: | $\leq 3$ μm |
| iv) Surface roughness: | Ra $\leq 1$ μm |

As the optical fibers to be used in the present invention, a quartz based communication optical fiber may be recited.

Figure 3:
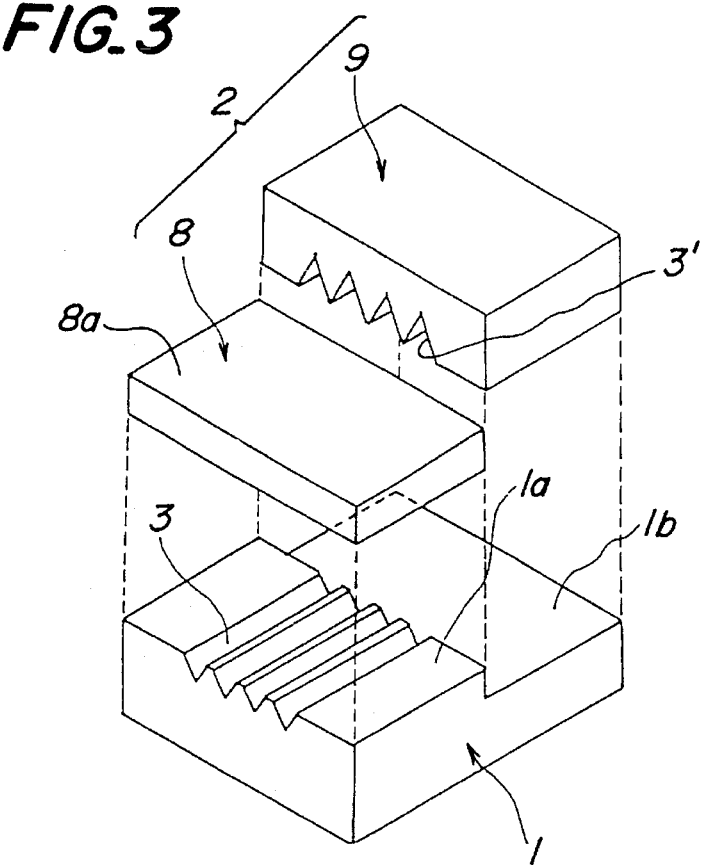
FIG. 3 is a perspective view illustrating a V-grooved base plate and a fixing plate to be used in a second embodiment of the joining process according to the present invention in a decomposed state.
Figure 4:
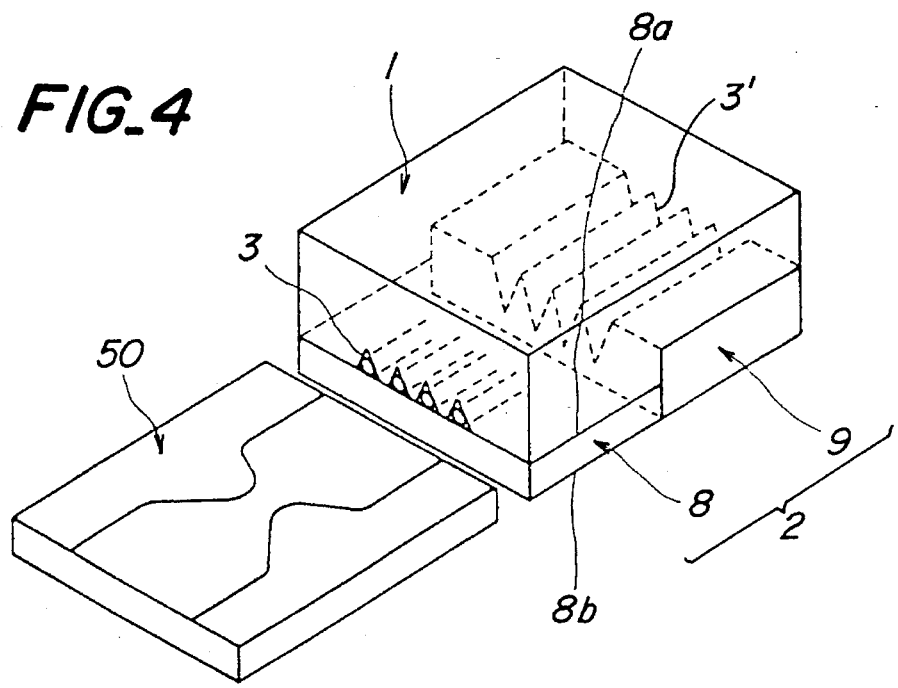
FIG. 4 is a perspective view illustrating the second embodiment of the joining process of the present invention.

FIGS. 3 and 4 illustrate the second embodiment of the joining process according to the present invention.

As illustrated in FIG. 3, in this embodiment, a V-grooved base plate 1 is constituted by a base plate portion $1a$ in which V-grooves 3 are formed and a base plate portion $1b$ connected to the base plate portion $1a$ through a step. Further, a fixing plate is divided into an optical fiber-fixing base plate portion 8 and a covering-fixing base plate portion 9. A surface of the fixing base plate portion 9 is provided with V-grooves 3' functioning in the same way as the recess 5 in FIG. 2(A), and the V-grooves 3' and the portion 1b of the V-grooved base plate perform the same function as the covering-receiving recesses 4 and 5 in FIG. 2(A) do. The second embodiment is particularly suited for a case where the optical fibers are independently and separately covered with an insulating material. When the optical fibers are to be optically joined to the opponent member 50, the optical fiber array is vertically reversed, and the surface 8b of the fixing base plate portion 8 opposed to the bared optical fiber-fixing surface 8a is used as a reference surface.

According to the second embodiment, since it is completely unnecessary to form a groove or recess in the fixing base plate portion 8 for fixing the bared optical fibers, this embodiment has the advantage in that the distance between the reference surface 8a and the centers of the bared optical fibers can be more accurately set as desired.

However, on the other hand, since the area of the reference surface 8a of the fixing base plate portion 8 is smaller, it is feared that workability may be slightly deteriorated. The following third embodiment of the joining process of the invention is intended to remove this problem.

FIGS. 5 and 6 illustrate the third embodiment in which a V-grooved base plate 1 is divided into a V-grooved portion 1c and a covering-fixing portion 1d. A fixing base plate 2 is of an unitary type as in FIG. 1. In the third embodiment, when the optical fibers are to be joined to an opponent member 50, as illustrated in FIG. 6, an entire optical fiber array using the V-grooved base plate 1 and the fixing base plate 2 is vertically reversed, and a surface 2b of the unitary fixing base plate 2 opposite to a surface 2a thereof to which the optical fibers are fixed is used as a reference surface. According to this third embodiment, since the unitary fixing base plate 2 gives a wider reference surface, workability is improved as compared with the second embodiment. In FIG. 5, reference numerals 4' and 5' are recesses which correspond to the covering-receiving recesses 4 and 5, respectively, and formed in the covering fixing portion 1d and the fixing base plate 2, respectively. Since the fixing base plate 2 needs no special fine working, it goes without saying that the distance between the reference surface and the centers of the optical fibers can be accurately set.

Figure 7:
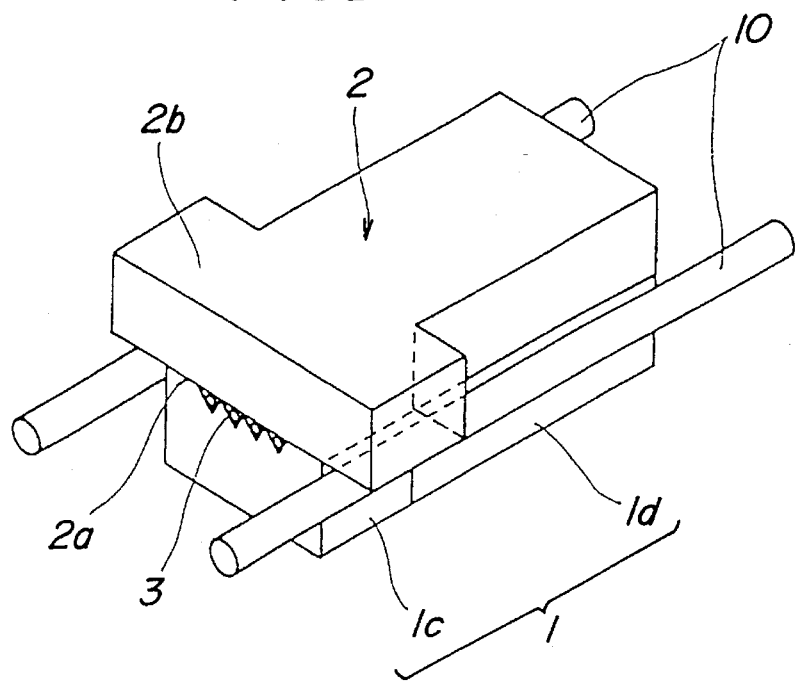
FIG. 7 is a perspective view illustrating an optical fiber array to be used in a fourth embodiment of the joining process according to the present invention.

A fourth embodiment of the joining process of the present invention is illustrated in FIG. 7, in which a V-grooved base plate 1 is divided into a V-grooved portion 1c and a covering-receiving portion 1d as in the case of the third embodiment illustrated in FIGS. 5 and 6, and the width of a portion of a fixing base plate corresponding to the V-grooved portion is made greater than that of the V-grooved portion 1c.

Figure 8:
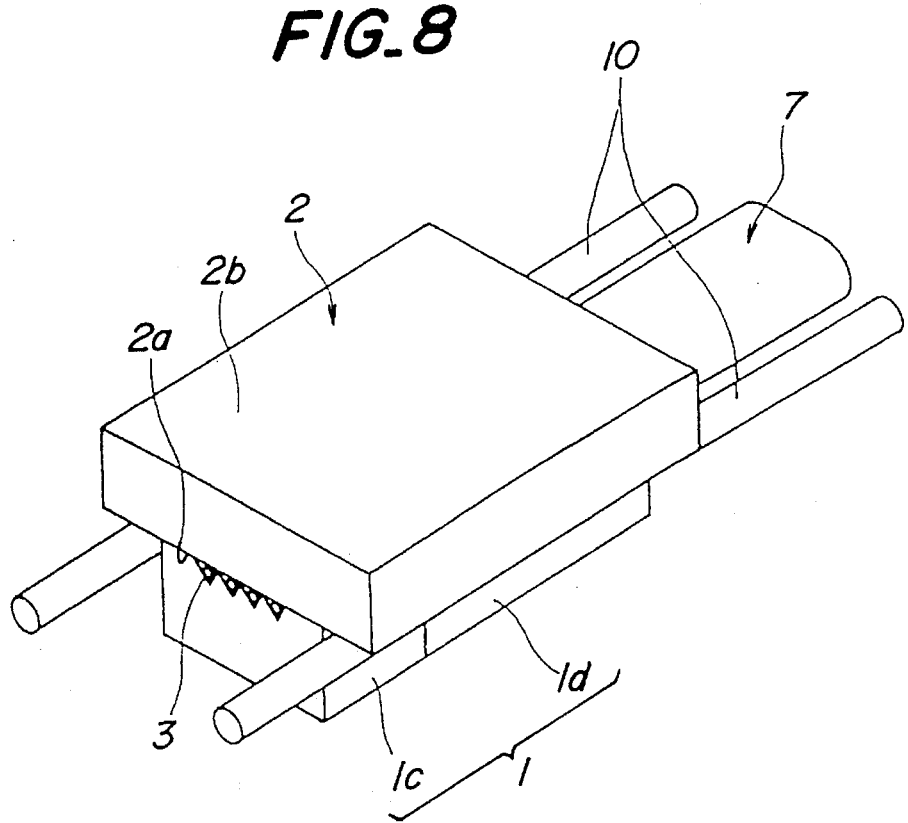
FIG. 8 is a perspective view illustrating an optical fiber array to be used in a fifth embodiment of the joining process according to the present invention.

Further, a fifth embodiment of the joining process of the present invention is illustrated in FIG. 8, in which a fixing base plate is made wider than a V-grooved base plate over its entire length corresponding to a V-grooved portion 1c and a covering-receiving portion 1d of the V-grooved base plate 1.

In the constructions of the fourth and fifth embodiments in FIGS. 7 and 8, reference jigs 10 are fixed to an optical fiber-fixing surface 2a as a joining reference surface of the fixing plate 2, an opponent member (not shown) is placed on the reference jigs 10, and then the optical fibers are optically joined to the opponent member.

In the embodiments of FIGS. 7 and 8, since the optical fiber-fixing surface 2a of the fixing base plate 2 is directly used as the reference surface, these embodiments have the advantage in that it is unnecessary to make the optical fiber-fixing surface 2a and its opposed surface of the fixing base plate 2 parallel.

As mentioned above, since the optical fiber array is optically joined to the opponent member by using, as the joining reference surface, the optical fiber-fixing surface or its opposite surface of the fixing base plate for fixing the optical fibers in the V-grooves of the V-grooved base plate, the distance from the reference surface to the centers of the optical fibers can be accurately set, and fine vertically adjustment is unnecessary for the optical joining between the optical fibers and the opponent member. Thus, the joining process of the present invention has the advantage in that the joining work can be effectively performed.

We claim:

1. A process for optically joining a plurality of optical fibers to an opponent member, comprising the steps of:

providing a V-grooved base plate having a plurality of V-grooves extending along a surface thereof, and a fiber-fixing base plate having first and second opposite major surfaces, said first surface having a flat portion;

placing a plurality of optical fibers in the V-grooves such that the optical fibers protrude from the V-grooves in a direction perpendicular to a direction of extension of the V-grooves;

forming an optical fiber array by joining said fiber-fixing base plate to said V-grooved base plate such that said optical fibers lie on said flat portion of said first surface of the fiber-fixing base plate; and optically joining the optical fibers of the optical fiber array to an opponent member by utilizing one of said first surface and said second surface of said fiber-fixing base plate as a joining reference surface.

2. The process of claim 1, wherein said opponent member includes a plurality of optical waveguides, said optical fibers being optically joined to respective optical waveguides.

3. The process of claim 1, wherein said opponent member has a bottom surface and an optical center, and the optical joining step is provided by placing said optical fiber array and said opponent member on a common flat plane, such that said second surface of said fiber-fixing base plate provides the joining reference surface, wherein the distance between the bottom surface and the optical center of the opponent member is substantially equal to a distance between said second surface of the fiber-fixing base plate and an optical center of the optical fibers.

4. The process of claim 1, wherein said optical fiber array is positioned such that the first surface of the fiber-fixing base plate lies on a jig, said opponent member is placed on the jig, and an optical center of the opponent member is aligned with optical centers of the optical fibers.

5. The process of claim 1, wherein said optical fibers each have a covering which is partially removed such that each optical fiber has a bared portion and a covered portion, and said optical fiber array includes a receptacle which receives the covered portion of each optical fiber.

6. The process of claim 5, wherein said V-grooved base plate includes a V-grooved portion along which said V-grooves extend, and a receiving portion in which the covered portions of the optical fibers are received, the receptacle being formed by said receiving portion of said V-grooved base plate and a portion of the fiber-fixing base plate opposed to said receiving portion.

7. The process of claim 6, wherein said V-grooved portion is formed separately from said receiving portion of said V-grooved based plate.

8. The process of claim 6, wherein said fiber-fixing base plate includes a first portion and a second portion opposing said V-grooved portion and said receiving portion of said V-grooved base plate, respectively.

9. The process of claim 1, wherein the V-grooved base plate has an end face at which the V-grooves terminate, and the optical fibers are provided in the V-grooves such that the optical fibers terminate at said end face.

10. The process of claim 1, wherein said first surface of said fiber-fixing base plate is used as the reference surface.

* * * * *